(12) United States Patent
More et al.

(10) Patent No.: US 9,043,529 B2
(45) Date of Patent: May 26, 2015

(54) METHOD TO FACILITATE FAST CONTEXT SWITCHING FOR PARTIAL AND EXTENDED PATH EXTENSION TO REMOTE EXPANDERS

(71) Applicant: LSI Corporation

(72) Inventors: Shankar T. More, Pune (IN); Vidyadhar C. Pinglikar, Pune (IN)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 248 days.

(21) Appl. No.: 13/683,531

(22) Filed: Nov. 21, 2012

(65) Prior Publication Data

US 2014/0143472 A1    May 22, 2014

(51) Int. Cl.
*G06F 13/00* (2006.01)
*G06F 3/06* (2006.01)

(52) U.S. Cl.
CPC ............ *G06F 3/0604* (2013.01); *G06F 3/0635* (2013.01); *G06F 3/0658* (2013.01); *G06F 3/0689* (2013.01)

(58) Field of Classification Search
CPC . G06F 13/4022; G06F 13/385; G06F 3/0601; G06F 3/0635; G06F 3/0689

USPC .......................................................... 710/316
See application file for complete search history.

(56) References Cited

U.S. PATENT DOCUMENTS

| | | | |
|---|---|---|---|
| 8,127,059 B1* | 2/2012 | Carr et al. ....................... 710/74 |
| 8,626,981 B1* | 1/2014 | Roberts et al. ................ 710/316 |
| 2005/0071532 A1* | 3/2005 | Bakke et al. ................... 710/300 |
| 2010/0153639 A1* | 6/2010 | Corry et al. ................... 711/113 |
| 2011/0138097 A1* | 6/2011 | Nakajima et al. ............. 710/316 |
| 2011/0145452 A1* | 6/2011 | Schilling et al. ................ 710/74 |
| 2012/0331181 A1* | 12/2012 | Govande et al. ................... 710/8 |
| 2014/0136739 A1* | 5/2014 | More et al. ...................... 710/105 |
| 2014/0229652 A1* | 8/2014 | Yadav et al. ................... 710/316 |
| 2014/0244875 A1* | 8/2014 | More et al. ..................... 710/116 |
| 2014/0258572 A1* | 9/2014 | More et al. ..................... 710/107 |

* cited by examiner

Primary Examiner — Faisal M Zaman
(74) Attorney, Agent, or Firm — Duft Bornsen & Fettig

(57) ABSTRACT

A method, apparatus, and system for switching from an existing target end device to a next target end device in a multi-expander storage topology by using Fast Context Switching. The method enhances Fast Context Switching by allowing Fast Context Switching to reuse or extend part of an existing connection path to an end device directly attached to a remote expander. The method can include reusing or extending at least a partial path of an established connection between an initiator and the existing target end device for a connection between the initiator and the next target end device, whereby the existing target end device and the next target end device are locally attached to different expanders.

20 Claims, 9 Drawing Sheets

METHOD TO FACILITATE FAST CONTEXT SWITCHING FOR PARTIAL AND EXTENDED PATH EXTENSION TO REMOTE EXPANDERS

BACKGROUND OF THE INVENTION

With link rates of up to 12 Gigabits per second (Gbits/sec), establishing a connection between an initiator and an end device through an expander incurs a significant penalty. For example, the time penalty of establishing a connection (i.e., connection overhead penalty) can be as significant as the amount of time it takes to send associated data frames between the initiator and the end device. Additionally, this connection overhead penalty becomes more pronounced as the number of cascaded expanders increases in a topology.

Therefore, it would be desirable and advantageous to provide a method, system, and apparatus to reduce connection overhead penalties by extending or reusing existing open connections to end devices attached to remote expanders.

SUMMARY OF THE INVENTION

Accordingly, a method is included for switching from an existing target end device to a next target end device in a multi-expander storage topology. The method can include receiving a done switch issued by an initiator. The done switch can be configured to close an established connection between the initiator and the existing target end device. The method can also include receiving, from the initiator or the upstream expander, a switch address frame. The switch address frame be configured to instruct the second expander locally attached to the next target end device to establish a connection between the initiator and the next target end device. The method can further include performing at least one of the following actions: reusing a partial path of the established connection between the initiator and the existing target end device for the connection between the initiator and the next target end device; or extending a path of the established connection between the initiator and the existing target end device for the connection between the initiator and the next target end device. The existing target end device and the next target end device are locally attached to different expanders. The method can be performed in a multi-expander topology, which can include at least one initiator and at least two expanders. The at least two expanders can include a first expander and a second expander, wherein the first expander is locally attached to the existing connected target end device and the second expander is locally attached to the next target end device.

Additional embodiments include an apparatus and a system configured for performing the method.

It is to be understood that both the foregoing general description and the following detailed description are exemplary and explanatory only and are not restrictive of the invention claimed. The accompanying drawings, which are incorporated in and constitute a part of the specification, illustrate embodiments of the invention and together with the general description, serve to explain the principles.

BRIEF DESCRIPTION OF THE DRAWINGS

The numerous objects and advantages of the present invention can be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Embodiments of the invention include enhancements to Fast Context Switching ("FCS") protocol to allow an initiator to optimally use, reuse, partially reuse, or extend an existing established connection of an existing target end device while accessing or switching to a next target end device. Embodiments of the disclosed invention enable an initiator to perform optimal utilization of an established connection while communicating with end devices in the system topology; thereby, embodiments of the disclosed invention reduce the overall connection overhead time and can increase I/O ("input/output") throughput of the system topology. Embodiments of the invention include a method, apparatus, system, and computer executable instructions stored in a non-transitory computer readable medium for performing a method for facilitating Fast Context Switching ("FCS") for reusing partial paths of existing connections and extending paths of existing connections. Embodiments can include a particular expander reusing an open connection between an initiator and an end device for a connection to a next end device attached to a remote expander by extending an existing path of the existing connection or by reusing a partial path of an existing connection.

Figure 1:
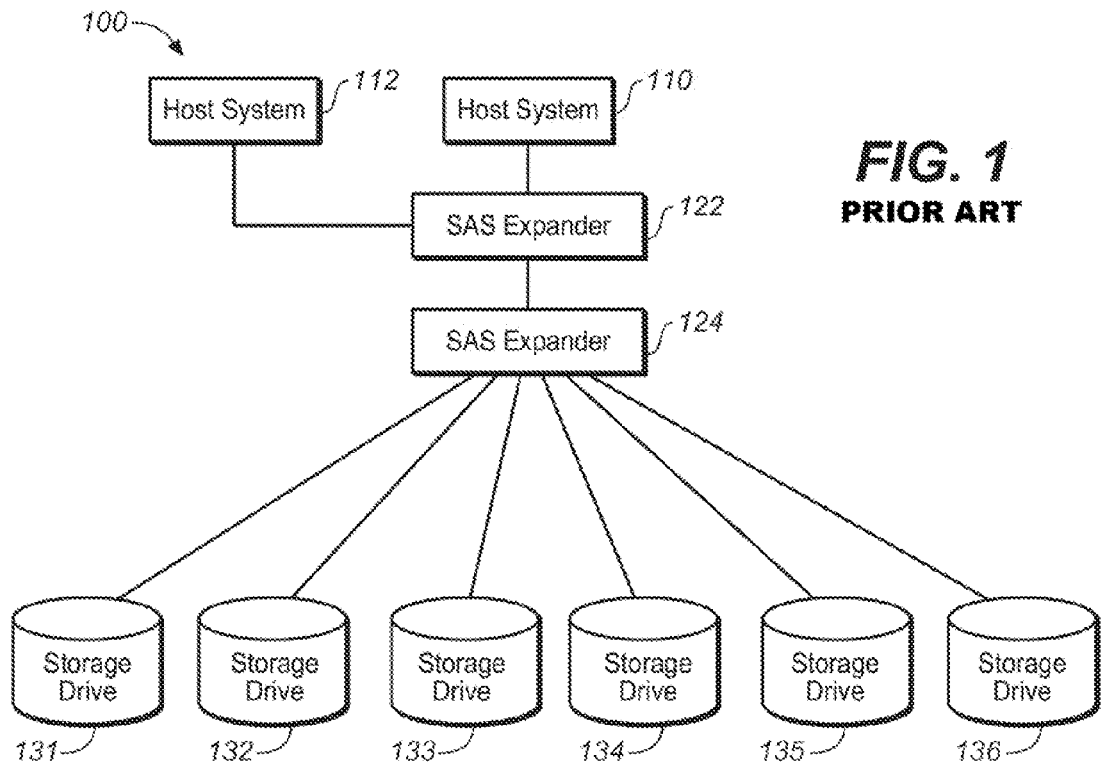
FIG. 1 shows a storage system topology.

Referring to FIG. 1, a typical storage topology 100 is depicted. The storage topology 100 can include a plurality of communicatively coupled devices, including: one or more host systems, such as host systems 110, 112; one or more expanders 122, 124, such as expanders on one or more levels or cascaded expanders; and a plurality of end devices, such as storage drives 131-136. (It should be noted that "host system" or "initiator" may be used interchangeably.) The plurality of devices of the storage topology 100 can be communicatively coupled over a wired/cabled or wireless network. For example, the plurality of devices of the storage topology 100 can be connected via SAS ("serial attached SCSI" ("small computer system interface")) cables, fibre channels, or the like.

Figure 2:
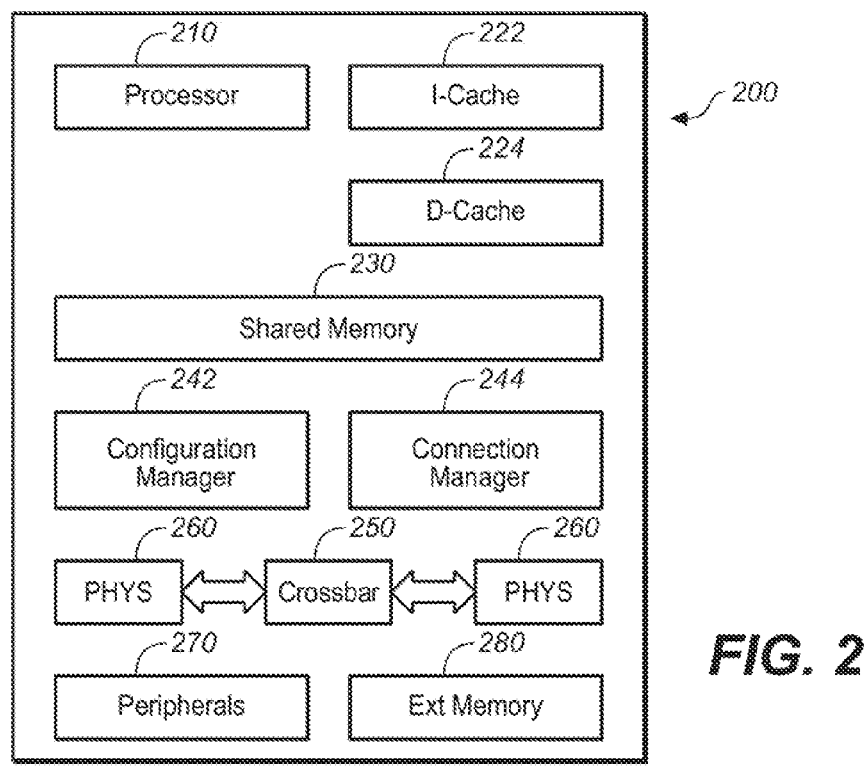
FIG. 2 shows an exemplary expander of embodiments of the invention.

Referring to FIG. 2, an exemplary expander suitable for being configured to perform embodiments of the invention is depicted. The expander 200 can be configured to utilize fast context switching (FCS) protocol. The expander can include a plurality of communicatively connected components, including: one or more processors 210; one or more caches, such as I-Cache 222 ("instruction cache") and D-Cache 224 ("data cache"); shared memory 230; a configuration manager 242; a connection manager 244; a crossbar 250; one or more expander link layers (XL); a plurality of phys 260; one or more interfaces for peripherals 270; external memory 280; and/or the like. In some implementations, the processor 210 can comprise an ARM processor (ARM was formerly known as "Advanced RISC ("reduced instruction set computer") Machine" or "Acorn RISC Machine"). The crossbar 250 can comprise a crossbar switch 250 for connecting multiple inputs to multiple outputs in a matrix manner. An interface for the peripherals 270 can include an I2C ("Inter-Integrated Circuit") interface, a UART ("universal asynchronous receiver/transmitter"), Ethernet interface, LPC ("low pin count") interface, or the like. The external memory 280 can include flash memory, non-volatile random access memory ("RAM"), pipelined burst static RAM ("PBSRAM"), or the like. The expander 200 can be configured to store identifying information for each initiator (such as a world wide name (WWN) of each initiator) whenever a connection is established through the expander 200 with an end device. The expander 200 can be configured to store the WWNs in a location file or a route table within the expander 200; for example the location file or route table can be stored within the shared memory 230, a storage medium of the connection manager 244, the one or more caches, the external memory 280, or the like. The expander 200 can be configured to store other path information, such as one or more end devices associated with the initiator, the expander chain path associated with the initiator, or the like. The expander 200 can further be configured to modify the route table or location file from the location file when an initiator's connection through the expander 200 with an end device is closed, switched, paused, interrupted, prioritized, deprioritized, rerouted, or otherwise changed.

Currently in storage topologies utilizing FCS protocol, when an initiator needs to perform a context switch from an existing target end device (such as a storage drive) to a next target end device, the initiator will send out a DONE_SWITCH primitive to the first expander of the expander chain. The DONE_SWITCH will be forwarded or passed through the intermediary expanders of the expander chain until the DONE_SWITCH primitive reaches the last expander of the expander chain, where the last expander of the expander chain is directly attached to the existing target end device. Upon receiving the DONE_SWITCH primitive, the last expander of the expander chain locally closes the connection with the existing target end device and waits for a SWITCH_ADDRESS_FRAME, which originates from the initiator. That is, when a device sends a DONE primitive it indicates that it has no more data to send. So when the DONE primitive is exchanged between end devices (e.g., an initiator and a target), it implies that the opened connection usage is over. Only when the DONE exchange is completed (with one being a DONE_SWITCH) can a new connection be established by sending a SWITCH_ADDRESS_FRAME (SAF) in an already established connection. Thus, the SAF cannot be sent until the DONE is exchanged.

The problem with this current mechanism is that it only allows for a connection context switch with the devices connected to the end expander.

Embodiments of the invention include instructing and/or configuring every expander in a connection path to monitor for the SWITCH_ADDRESS_FRAME as a DONE_SWITCH primitive is propagated through a chain of expanders.

Various possible scenarios may require expanders in a connection path to perform different actions to perform a context switch from an existing target end device (i.e., the end device to which the initiator is currently connected) to a next target end device. FIGS. 3-7 depict embodied topologies which can handle exemplary possible scenarios for performing a context switch of an established initiator-to-end-device connection to a next connection between the initiator and a next target end device of a system topology.

Figure 3:
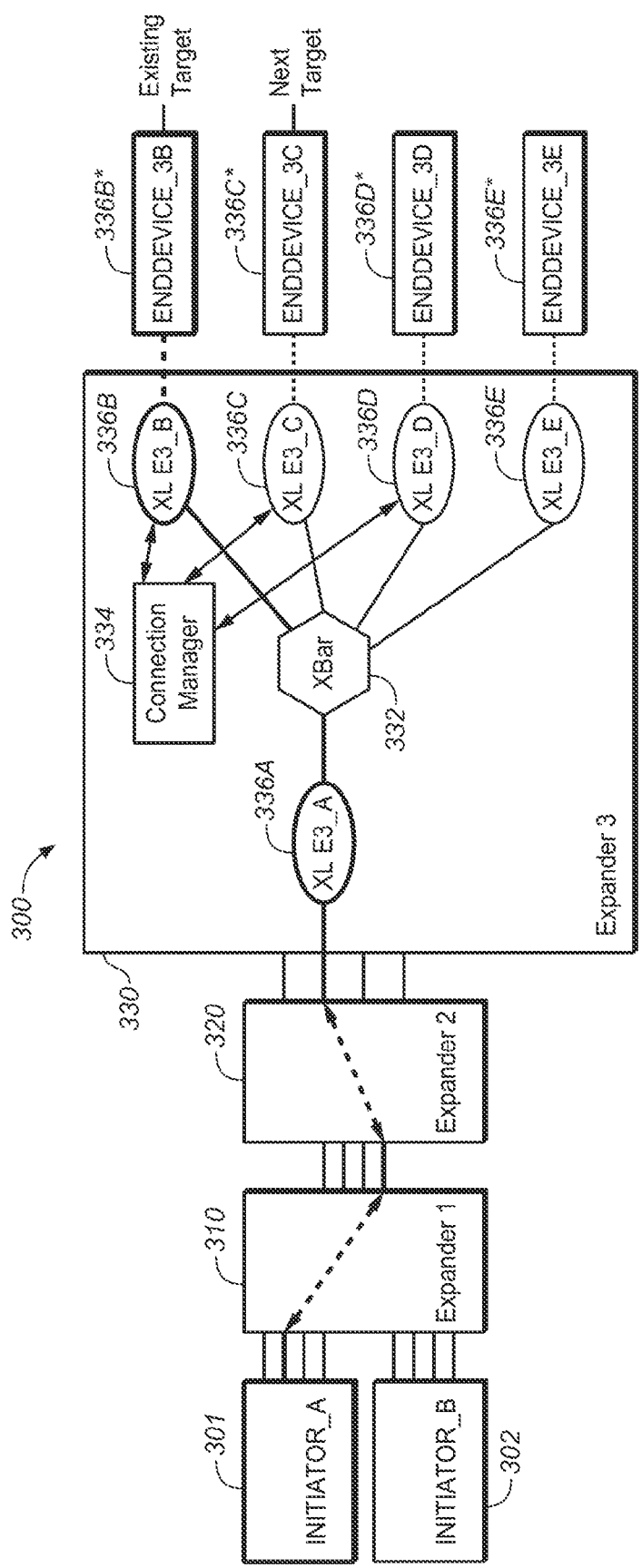
FIG. 3 shows a system topology where a next target end device is attached to a same expander to which a current established target device connection is active.

Referring to FIG. 3, a multi-expander system topology 300 where a next target device 336C* is directly (i.e., locally) attached to a same expander 330 to which a current established end device connection is active. The system topology 300 can include a plurality of communicatively coupled devices. As shown in FIG. 3, the system topology 300 can include: initiator 301; initiator 302; expanders 310, 320, 330; and a plurality of end devices (such as storage drives (e.g., hard disk drives or solid state drives), or the like).

In some implementations, one or more of the expanders 310, 320, 330 of the system topology 300 can be configured as expander 200 of FIG. 2; in some implementations, one or more of the expanders 310, 320, 330 of the system topology 300 can be configured in a different way than expander 200 of FIG. 2. For example, expander 330 can include a plurality of phys and/or expander link layers 336A-E, a crossbar switch 332, a connection manager 334, other computer components (such as computer components depicted in expander 200 of FIG. 2), and/or the like.

Each initiator can be directly attached and communicatively coupled to one or more expanders and one or more end devices. Each expander can be directly attached and communicatively coupled to one or more initiators, one or more expanders, and/or one or more end devices. For example, in FIG. 3, end devices 336B*, 336C*, 336D*, 336E* are directly attached to expander 330.

For the system topology 300 of FIG. 3, there are a plurality of possible connection paths for connecting a particular initiator to a particular end device. For example, FIG. 3 depicts an initiator 301 with an established initiator-to-device connection through a chain of expanders (i.e., expander 310 to expander 320 to expander 330) to an existing target end device 336B*. Currently, fast context switching protocol (FCS) only allows for the reuse of connections to end devices directly attached to the same last expander of an initiator-to-existing-end-target path. In other words, currently, FCS allows for the reuse of an established connection if the expander chain path remains exactly the same for the next target end device. For example, in FIG. 3, the expander chain path (expander 310 to expander 320 to expander 330) is the same for the established initiator(301)-toexisting-target-end-device (336B*) connection as it would be for the initiator 301 to connect to the next target device 336C*; likewise, the existing target end device 336B* and the next target end device 336C* are both directly (i.e., locally) attached to the same expander 330.

In the current system topology 300 using existing FCS implementation, the expander can utilize FCS to reuse the existing open connection to switch between locally attached end devices. For example, the expander 330 can switch the established connection between the initiator 301 and existing target end device 336B* to establish a connection with directly attached next target end device 336C*. To perform this connection switch using FCS, the expander 330 prepares an OPEN_ADDRESS_FRAME ("OAF") and forwards the OAF to the directly attached next target end device 336C*. The subsequent sequence of actions by the expander 330 to complete the reuse of the expander path of the connection follow the existing OAF response procedure of existing FCS protocol.

Currently, however, FCS does not allow for the reuse or expansion of connections to end devices which are connected to a remote expander (i.e., where end devices are directly attached to different expanders).

Referring generally now to FIGS. 4-7, according to embodiments for enhancing fast context switching (FCS) protocol, all or a portion of the initiator-expander-chain path can be reused or expanded upon without having to reconfigure or reestablish the connection settings for each of the expanders in the initiator-expander-chain path.

Figure 4:
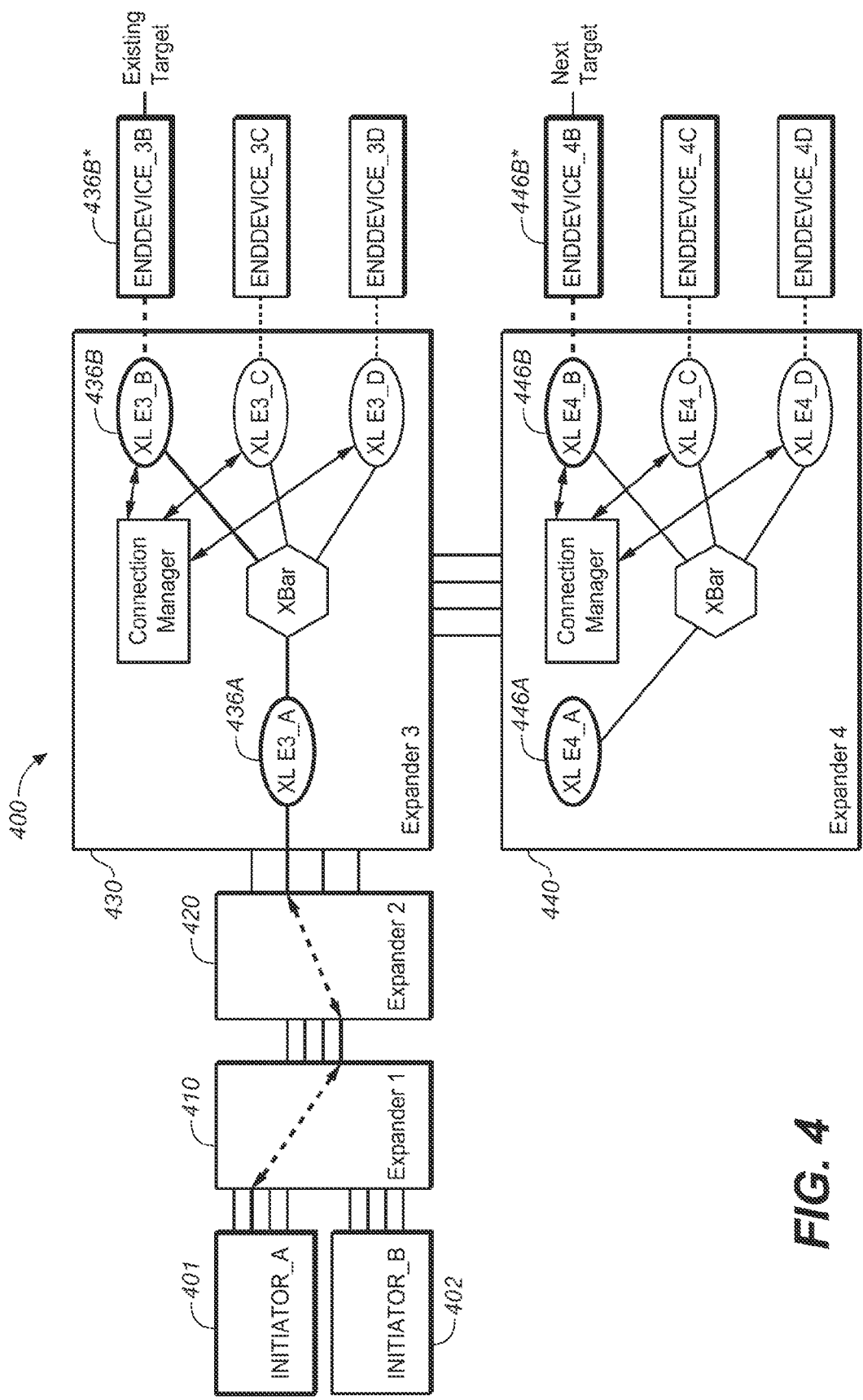
FIG. 4 shows a system topology where a next target end device is attached to an expander having an extended path of a path of an established connection for the existing target end device.

Referring to FIG. 4, the depiction of an established expander path configured to be reused by expanding upon the established expander path is shown. A system topology 400 can include a plurality of communicatively coupled devices. As shown in FIG. 4, the system topology 400 can include: initiator 401; initiator 402; expanders 410, 420, 430, 440; a plurality of end devices, or the like.

In some implementations, one or more of the expanders 410, 420, 430, 440 of the system topology 400 can be configured as expander 200 of FIG. 2; in some implementations, one or more of the expanders 410, 420, 430, 440 of the system topology 400 can be configured in a different way than expander 200 of FIG. 2. For example, expander 430 can include a plurality of phys and/or expander link layers 436A-B, a crossbar switch, a connection manager, other computer components (such as computer components depicted in expander 200 of FIG. 2), and/or the like. Similarly, expander 440 can include a plurality of phys and/or expander link layers 446A-B, a crossbar switch, a connection manager, other computer components (such as computer components depicted in expander 200 of FIG. 2), and/or the like.

Each initiator 401, 402 can be directly attached and communicatively coupled to one or more expanders and one or more end devices. Each expander can be directly attached and communicatively coupled to an initiator, one or more expanders, and/or one or more end devices. For example, in FIG. 4, end device 436B* is directly attached to expander 430, and end device 446B* is directly attached to expander 440. End device 436B* can be described as being remotely or non-locally connected to expanders 410, 420, 440 (i.e., end device 436B* is not directly attached to expanders 410, 420, 440).

For the system topology 400 of FIG. 4, there are a plurality of possible connection paths for connecting a particular initiator to a particular end device. For example, FIG. 4 depicts an initiator 401 with an established initiator-to-device connection through a chain of expanders (i.e., expander 410 to expander 420 to expander 430) to an existing target end device 436B*.

Embodiments of the invention enable fast context switching protocol (FCS) to reuse connections to end devices which are remotely attached (i.e., not directly attached) to the last expander of an initiator-to-existing-end-target path. In other words, embodiments of the invention enhance FCS protocol for expanders such that a modified, partial, or extended expander chain path of an established connection (i.e., the connection to existing target end device 436B*) can be reused for establishing a connection to the next target end device 446B*.

For example, in FIG. 4, the expander chain path for the established initiator (401)-to-existing-end-target (436B*) connection is expander 410 to expander 420 to expander 430. The expander chain path of expander 410 to expander 420 to expander 430 can be extended and reused for establishing a connection between the initiator 401 and the next target end device 446B* of the remote expander 440 (i.e., the expander 440 is not directly attached to the currently connected existing target device 436B*).

When the initiator 401 determines that it wants to switch connections from existing target end device 436B* to the next target end device 446B*, the initiator 401 and expanders of the multi-expander topology 400, perform the actions described herein.

Initiator 401 issues a DONE_SWITCH to existing target end device 436B*. In some implementations, upon the issuance of the DONE_SWITCH, expanders 410, 420, 430 (i.e., expanders in the expander chain path of the initiator 401 to existing target end device 436B* connection) do not wait for a SWITCH_ADDRESS_FRAME (SAF); that is, the expanders 410, 420, 430 continue to operate as though connection to existing target end device 436B* is still active. Additionally, in some implementations, upon the issuance of the DONE_SWITCH, expanders 410, 420, 430 should be configured to monitor or wait for an SAF.

Upon, or at the same time as issuing the DONE_SWITCH, the initiator 401 issues an SAF for the next target end device 446B* by passing the SAF to the first expander 410. It should be noted that the initiator 401 can pass the SAF to the first expander 410 before the DONE_SWITCH is received by the last expander 430 directly attached to the existing target end device 436B*.

Expander 410 receives the SAF from the initiator 401. Expander 410 determines if the next target end device 446B* is in a same path as that of a downstream path of the existing open connection. Here, the expander 410 determines that path for the next target end device 446B* is in the path of the next expander 420 which is in the expander chain path of the existing open connection; upon this determination, the expander 410 then passes the SAF for the next target end device 446B* to the next expander 420.

Expander 420 receives the SAF from the expander 410. Expander 420 determines if the next target end device 446B* is in a same path as that of a downstream path of the existing open connection. Here, the expander 420 determines that path for the next target end device 446B* is in the path of the next expander 430 which is in the expander chain path of the existing open connection; upon this determination, the expander 420 then passes the SAF for the next target end device 446B* to the next expander 430.

Expander 430 receives the SAF from the expander 420. As the expander is the last expander of the expander chain of the existing open connection and next target device 446B* is not directly attached to the expander 430, the expander 430 will determine that next target end device 446B* is not in the downstream path of the existing open connection. Upon the determination that next target end device 446B* is on a different path than the currently established connection, the expander 430 will close the connection with existing target end device 436B* by locally exchanging the close primitive and extend the established connection to the next target end device 446B*. Expander 430 extends the existing expander chain path of the connection by passing the SAF as a normal OAF to expander 440 and follows normal open protocol procedure.

Expander 440 receives the OAF from the expander 430 and opens a connection with the next target end device 446B*.

Figure 5:
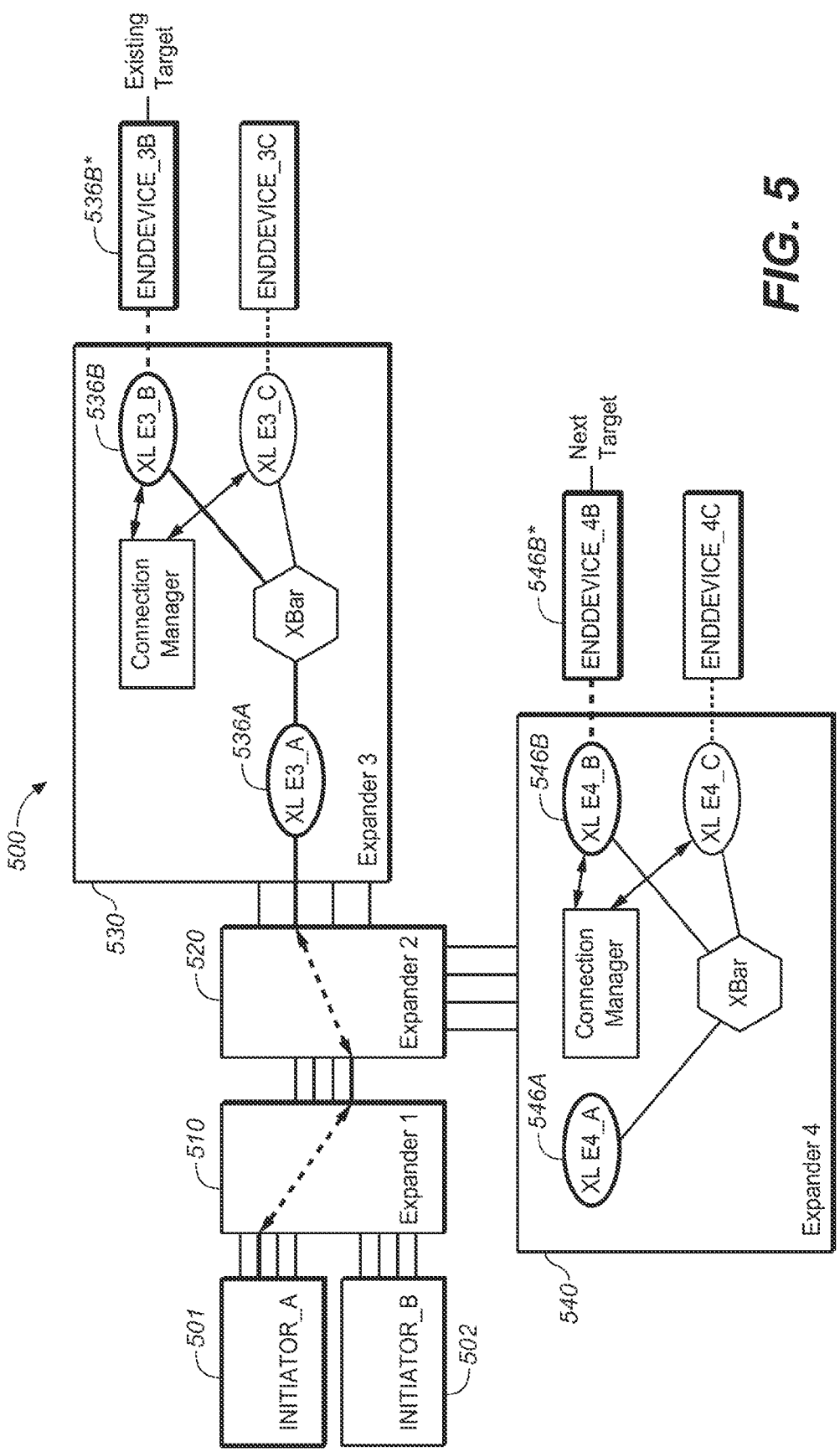
FIG. 5 shows a further system topology where a next target end device is attached to an expander having an extended path of a path of an established connection for the existing target end device.

Referring to FIG. 5, an exemplary depiction of an established expander path configured to be partially reused is shown. A system topology 500 can include a plurality of communicatively coupled devices. As shown in FIG. 5, the system topology 500 can include: initiator 501; initiator 502; expanders 510, 520, 530, 540; a plurality of end devices, or the like.

In some implementations, one or more of the expanders 510, 520, 530, 540 of the system topology 500 can be configured as expander 200 of FIG. 2; in some implementations, one or more of the expanders 510, 520, 530, 540 of the system topology 500 can be configured in a different way than expander 200 of FIG. 2. For example, expander 530 can include a plurality of phys and/or expander link layers 536A-B, a crossbar switch, a connection manager, other computer components (such as computer components depicted in expander 200 of FIG. 2), and/or the like. Similarly, expander 540 can include a plurality of phys and/or expander link layers 546A-B, a crossbar switch, a connection manager, other computer components (such as computer components depicted in expander 200 of FIG. 2), and/or the like.

Each initiator 501, 502 can be directly attached and communicatively coupled to one or more expanders and/or one or more end devices. Each expander can be directly attached and communicatively coupled to an initiator, one or more expanders, and/or one or more end devices. For example, in FIG. 5, end device 536B* is directly attached to expander 530, and end device 546B* is directly attached to expander 540.

For the system topology 500 of FIG. 5, there are a plurality of possible connection paths for connecting a particular initiator to a particular end device. For example, FIG. 5 depicts an initiator 501 with an established initiator-to-device connection through a chain of expanders (i.e., expander 510 to expander 520 to expander 530) to an existing target end device 536B*.

Embodiments of the invention enable fast context switching protocol (FCS) to partially reuse connections to end devices which are remotely attached (i.e., not directly attached) to the last expander of an established initiator-to-existing-end-target path. For example, the connection to existing target end device 536B* can be partially reused for establishing a connection to the next target end device 546B*.

In FIG. 5, the expander chain path for the established initiator (501)-to-existing-end-target (536B*) connection is expander 510 to expander 520 to expander 530. The expander chain path of expander 510 to expander 520 to expander 530 can be partially reused for establishing a connection between the initiator 501 and the next target end device 546B* of the remote expander 540.

When the initiator 501 determines that the initiator 501 will switch connections from existing target end device 536B* to the next target end device 546B*, the initiator 501 and expanders of the multi-expander topology 500, perform the actions described herein.

Initiator 501 issues a DONE_SWITCH to existing target end device 536B*. Upon or at the same time as the issuance of the DONE_SWITCH, all of the expanders 510, 520, 530, which are in the connection path, wait for a SWITCH_ADDRESS_FRAME (SAF); that is, each of the expanders 510, 520, 530 in the existing connection path monitor for an SAF upon receiving the DONE_SWITCH from the initiator 501.

Upon, or at the same time as issuing the DONE_SWITCH, the initiator 501 issues an SAF for the next target end device 546B* by passing the SAF to the first expander 510. It should be noted that the initiator 501 can pass the SAF to the first expander 510 before the DONE_SWITCH is received by the last expander 530 directly attached to the existing target end device 536B*.

Expander 510 receives the SAF from the initiator 501. Expander 510 determines if the next target end device 546B* is in the same path of a downstream expander of the existing open connection. Here, the expander 510 determines that the next target end device 546B* has a path through the downstream expander 520 of the existing open connection; upon this determination, the expander 510 then passes the SAF for the next target end device 546B* to the next expander 520. Expander 520 receives the SAF from the expander 510. Expander 520 determines if the next target end device 546B* is in the remainder of the same path of the existing open connection. Here, the expander 520 determines that next target end device 546B* is on a different path than the remainder of the path of the currently existing connection. Upon the determination that next target end device 546B* is on a different path than the currently established connection, the expander 520 will perform two actions: a) close the connection with existing target end device 536B* by closing the connection through any remaining downstream expanders (i.e., expander 530); and b) extend the established connection to the next target end device 546B*. Expander 520 extends the existing expander chain path of the connection by passing the SAF as a normal OAF to expander 540.

Expander 540 receives the OAF from the expander 520 and opens a connection with the next target end device 546B*.

Figure 6:
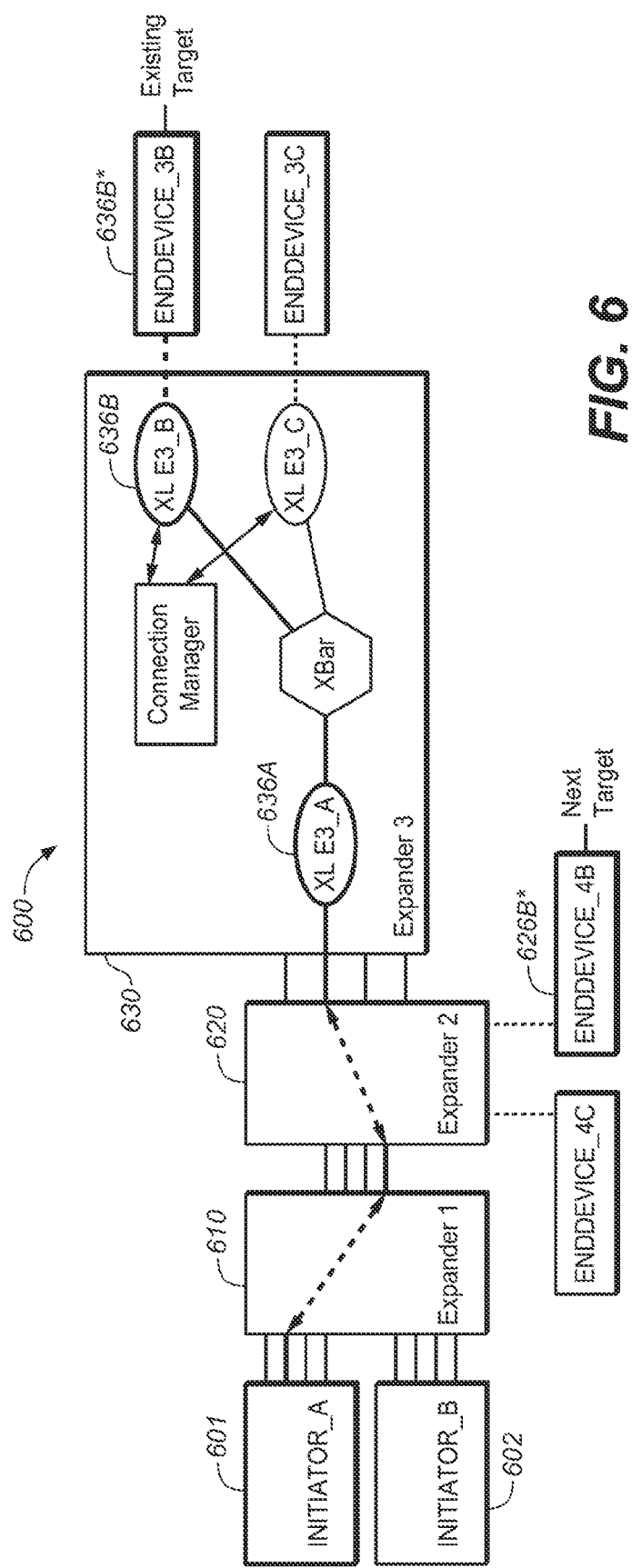
FIG. 6 shows a system topology where a next target end device is attached to an expander having a partial path of a path of an established connection for the existing target end device.

Referring to FIG. 6, a further exemplary depiction of an established expander path configured to be partially reused is shown. A system topology 600 can include a plurality of communicatively coupled devices. As shown in FIG. 6, the system topology 600 can include: initiator 601; initiator 602; expanders 610, 620, 630; a plurality of end devices, or the like.

In some implementations, one or more of the expanders 610, 620, 630 of the system topology 600 can be configured as expander 200 of FIG. 2; in some implementations, one or more of the expanders 610, 620, 630 of the system topology 600 can be configured in a different way than expander 200 of FIG. 2. For example, expander 630 can include a plurality of phys and/or expander link layers 636A-B, a crossbar switch, a connection manager, other computer components (such as computer components depicted in expander 200 of FIG. 2), and/or the like.

Each initiator 601, 602 can be directly attached and communicatively coupled to one or more expanders and/or one or more end devices. For example, in FIG. 6, end device 636B* is directly attached to expander 630, and end device 626B* is directly attached to expander 620.

For the system topology 600 of FIG. 6, there are a plurality of possible connection paths for connecting a particular initiator to a particular end device. For example, FIG. 6 depicts an initiator 601 with an established initiator-to-device connection through a chain of expanders (i.e., expander 610 to expander 620 to expander 630) to an existing target end device 636B*.

Embodiments of the invention enable fast context switching protocol (FCS) to partially reuse connections to end devices which are remotely attached (i.e., not directly attached) to the last expander of an established initiator-to-existing-end-target path. For example, the connection to existing target end device 636B* can be partially reused for establishing a connection to the next target end device 626B*.

In FIG. 6, the expander chain path for the established initiator (601)-to-existing-end-target (636B*) connection is expander 610 to expander 620 to expander 630. The expander chain path of expander 610 to expander 620 to expander 630 can be partially reused for establishing a connection between the initiator 601 and the next target end device 626B* of the expander 620.

When the initiator 601 determines that the initiator 601 needs to switch connections from existing target end device 636B* to the next target end device 626B*, the initiator 601 and expanders of the multi-expander topology 600, perform the actions described herein, which are similar to those actions described in FIG. 6.

Initiator 601 issues a DONE_SWITCH to existing target end device 636B*. Upon or at the same time as the issuance of the DONE_SWITCH, all of the expanders 610, 620, 630, which are in the connection path, wait for a SWITCH_ADDRESS_FRAME (SAF); that is, each of the expanders 610, 620, 630 in the existing connection path monitor for an SAF upon receiving the DONE_SWITCH from the initiator 601.

Upon, or at the same time as issuing the DONE_SWITCH, the initiator 601 issues an SAF for the next target end device 626B* by passing the SAF to the first expander 610. It should be noted that the initiator 601 can pass the SAF to the first expander 610 before the DONE_SWITCH is received by the last expander 630 directly attached to the existing target end device 626B*.

Expander 610 receives the SAF from the initiator 601. Expander 610 determines if the next target end device 626B* is in the same downstream path of the existing open connection. Here, the expander 610 determines that the next target end device 626B* has a path through the next expander 620 of the path of the existing open connection; upon this determination, the expander 610 then passes the SAF for the next target end device 626B* to the next expander 620.

Expander 620 receives the SAF from the expander 610. Expander 620 determines if the next target end device 626B* is in the remainder of the same path of the existing open connection. Here, the expander 620 determines that next target end device 626B* is on a different path than the remainder of the path of the currently existing connection; here, the expander 620 determines that the next target end device 626B* is directly attached to expander 620. Upon this determination, the expander 620 will perform two actions: a) close the connection with existing target end device 636B* by closing the connection through any remaining downstream expanders (i.e., expander 630); and b) establish a connection to the next target end device 626B*.

Figure 7:
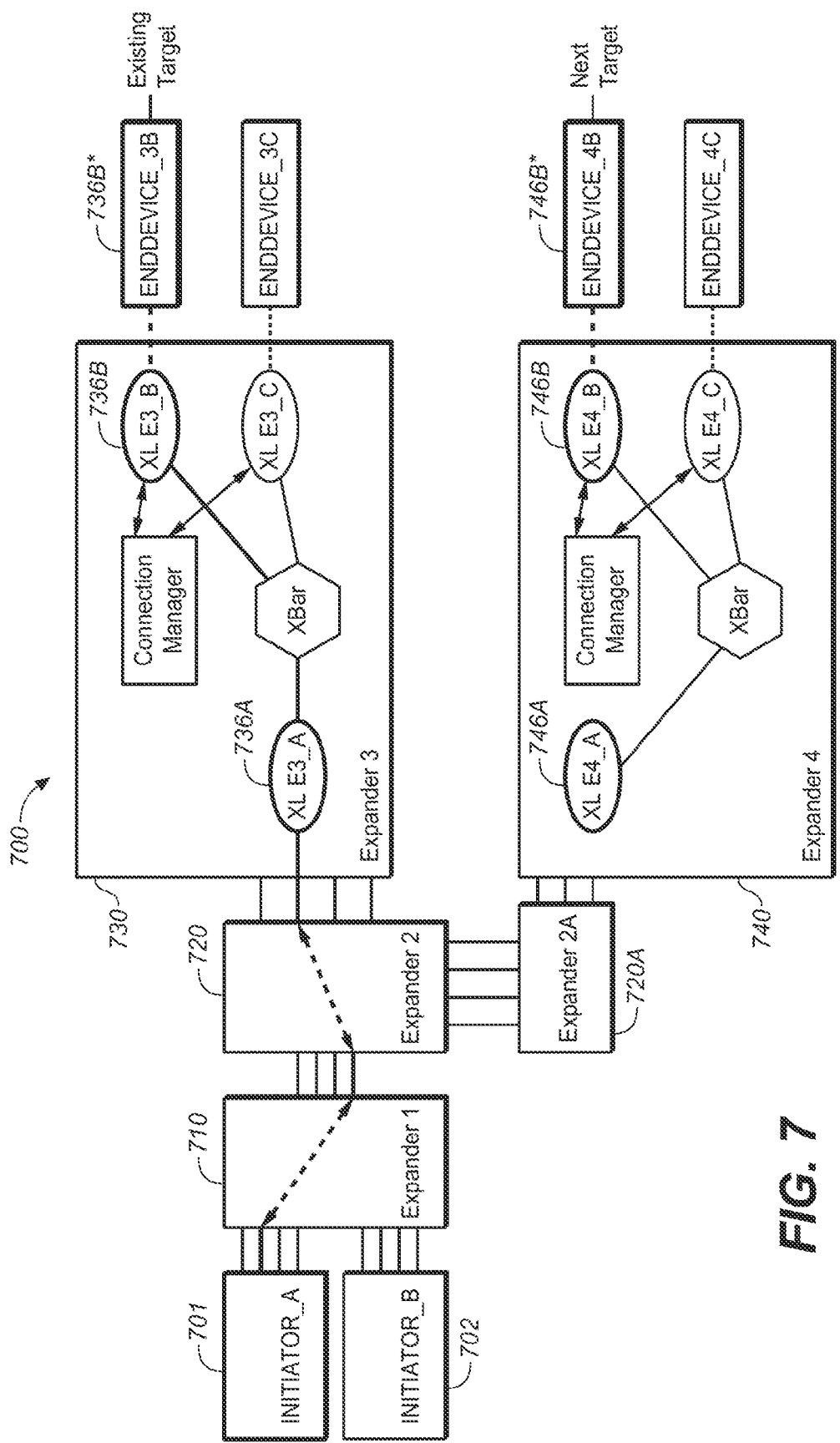
FIG. 7 shows a further system topology where a next target end device is attached to an expander having an extension of a partial path of a path of an established connection for the existing target end device.

Referring to FIG. 7, an exemplary depiction of an established expander path configured to be partially reused and expanded upon is shown. A system topology 700 can include a plurality of communicatively coupled devices. As shown in FIG. 7, the system topology 700 can include: initiator 701; initiator 702; expanders 710, 720, 720A, 730, 740; a plurality of end devices; or the like.

In some implementations, one or more of the expanders 710, 720, 720A, 730, 740 of the system topology 700 can be configured as expander 200 of FIG. 2; in some implementations, one or more of the expanders 710, 720, 720A, 730, 740 of the system topology 700 can be configured in a different way than expander 200 of FIG. 2. For example, expander 730 can include a plurality of phys and/or expander link layers 736A-B, a crossbar switch, a connection manager, other computer components (such as computer components depicted in expander 200 of FIG. 2), and/or the like. Similarly, expander 740 can include a plurality of phys and/or expander link layers 746A-B, a crossbar switch, a connection manager, other computer components (such as computer components depicted in expander 200 of FIG. 2), and/or the like.

Each initiator 701, 702 can be directly attached and communicatively coupled to one or more expanders and/or one or more end devices. Each expander can be directly attached and communicatively coupled to an initiator, one or more expanders, and/or one or more end devices. For example, in FIG. 7, end device 736B* is directly attached to expander 730, and end device 746B* is directly attached to expander 740.

For the system topology 700 of FIG. 7, there are a plurality of possible connection paths for connecting a particular initiator to a particular end device. For example, FIG. 7 depicts an initiator 701 with an established initiator-to-device connection through a chain of expanders (i.e., expander 710 to expander 720 to expander 730) to an existing target end device 736B*.

Embodiments of the invention enable fast context switching protocol (FCS) to partially reuse connections to end devices which are remotely attached (i.e., not directly attached) to the last expander of an established initiator-to-existing-end-target path. For example, the connection to existing target end device 736B* can be partially reused for establishing a connection to the next target end device 746B*.

In FIG. 7, the expander chain path for the established initiator (701)-to-existing-end-target (736B*) connection is expander 710 to expander 720 to expander 730. The expander chain path of expander 710 to expander 720 to expander 730 can be partially reused for establishing a connection between the initiator 701 and the next target end device 746B* of the remote expander 740.

When the initiator 701 determines to switch connections from existing target end device 736B* to the next target end device 746B*, the initiator 701 and expanders of the multi-expander topology 700, perform the actions described herein.

Initiator 701 issues a DONE_SWITCH to existing target end device 736B*. Upon, or at the same time as the issuance of the DONE_SWITCH, all of the expanders 710, 720, 730, which are in the connection path, wait for a SWITCH_ADDRESS_FRAME (SAF); that is, each of the expanders 710, 720, 730 in the existing connection path monitor for an SAF upon receiving the DONE_SWITCH from the initiator 701.

Upon, or at the same time as issuing the DONE_SWITCH, the initiator 701 issues an SAF for the next target end device 746B* by passing the SAF to the first expander 710. It should be noted that the initiator 701 can pass the SAF the first expander 710 before the DONE_SWITCH is received by the last expander 730 directly attached to the existing target end device 736B*.

Expander 710 receives the SAF from the initiator 701. Expander 710 determines if the next target end device 746B* is in the same path as the remainder of the downstream path of the existing open connection. This may include checking and/or comparing a route table or a location to file to make this determination. Here, the expander 710 determines that the next target end device 746B* has a path which includes the next expander 720 of the existing open connection; upon this determination, the expander 710 then passes the SAF for the next target end device 746B* to the next expander 720.

Expander 720 receives the SAF from the expander 710. Expander 720 determines if the next target end device 746B* is in the remainder of the same path of the existing open connection. Here, the expander 720 determines that next target end device 746B* has a path different than the remainder of the path of the currently existing connection. Upon the determination that next target end device 746B* is on a different path, the expander 720 will perform two actions: a) close the connection with existing target end device 736B* by closing the connection through any remaining downstream expanders (i.e., expander 730); and b) extend the established connection to the next target end device 746B*. Expander 720 extends the existing expander chain path of the connection by passing the SAF as a normal OAF to expander 720A, which further passes the OAF to expander 740.

Expander 740 receives the OAF from the expander 720A and opens a connection with the next target end device 746B*.

Figure 8:
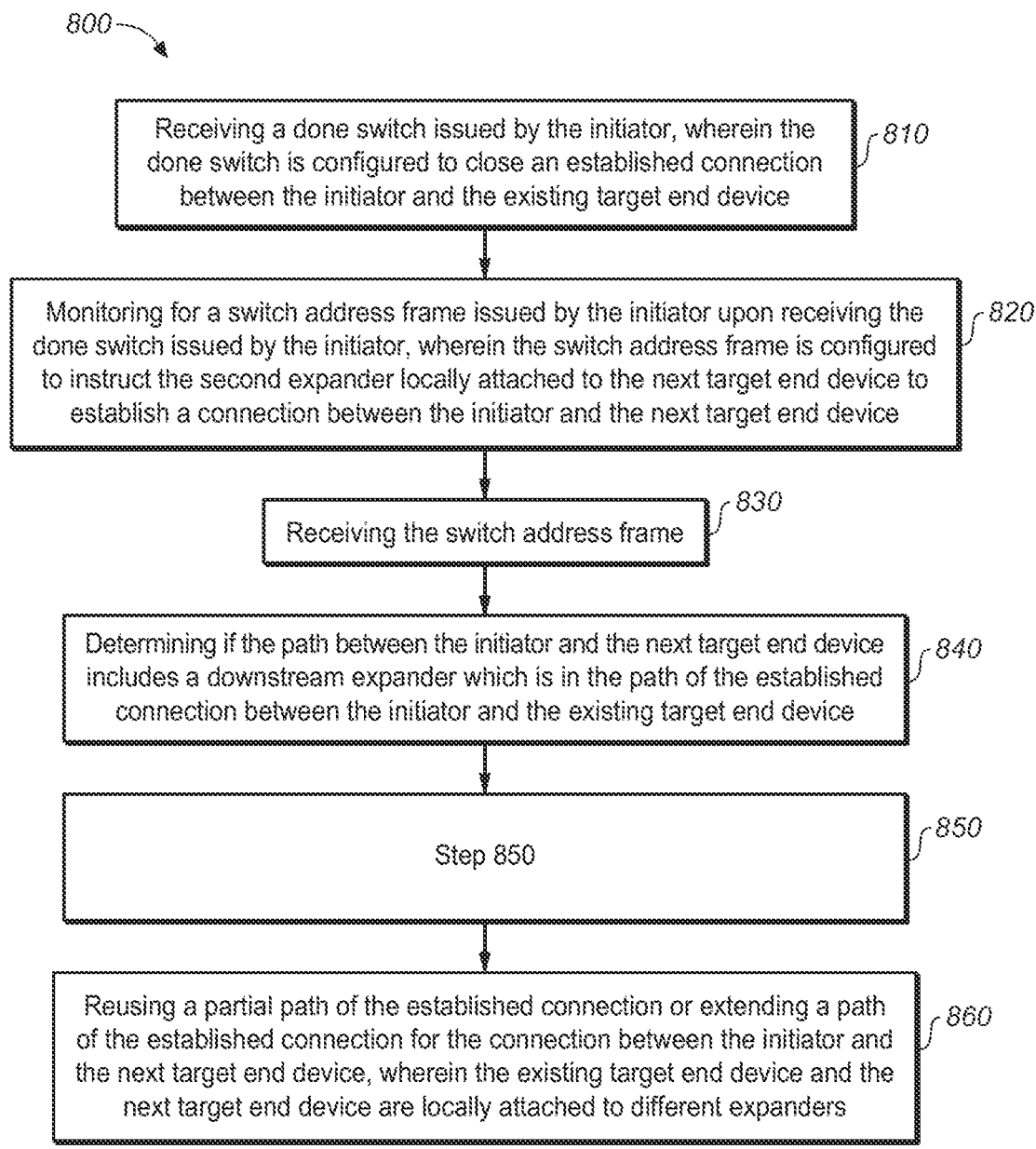
FIG. 8 shows an embodied method of the invention.

Referring to FIG. 8, an embodied method 800 for switching from an existing target end device to a next target end device in a multi-expander storage topology is depicted. The multi-expander topology can include at least one initiator and at least two expanders. The at least two expanders can include a first expander and a second expander, wherein the first expander is locally attached to the existing target end device and the second expander is locally attached to the next target end device. It is contemplated that embodiments of the method 800 can be performed by a multi-expander storage topology; an expander 200 configured for using a version of fast context switching protocol; components or modules of the expander 200; software or firmware executed on a computing device (such as the expander 200, a controller, or a processor); other computing devices; other computer components; or on other software, firmware, or middleware of the multi-expander storage topology. The method 800 can include any or all of steps 810, 820, 830, 840, 850 or 860, and it is contemplated that the method 800 can include additional steps as disclosed throughout, but not explicitly set forth in this paragraph. Further, it is fully contemplated that the steps of the method 800 can be performed concurrently or in a non-sequential order. Likewise, it is fully contemplated that the method 800 can be performed prior to, subsequent to, or in combination with the performance of one or more steps of one or more other embodied methods disclosed throughout.

The method 800 can include a step 810, wherein the step 810 includes receiving a done switch issued by the initiator, wherein the done switch is configured to close an established connection between the initiator and the existing target end device.

The method 800 can include a step 820, wherein the step 820 includes monitoring for a switch address frame issued by the initiator upon receiving the done switch issued by the initiator. The switch address frame can be configured to instruct the second expander locally attached to the next target end device to establish a connection between the initiator and the next target end device.

The method can also include a step of forwarding the done switch to the last expander on a path of the established connection between the initiator and the existing target end device.

The method 800 can also include a step 830, wherein the step 830 includes receiving the switch address frame.

The method 800 can also include a step 840, wherein step 840 includes determining if the path between the initiator and the next target end device includes a downstream expander which is in the path of the established connection between the initiator and the existing target end device.

The method 800 can also include a step 850, wherein step 850 can include: a) forwarding the switch address frame to the downstream expander which is in the path of the established connection between the initiator and the existing target end device upon a determination that the path between the initiator and the next target end device includes the downstream expander which is in the path of the established connection between the initiator and the existing target end device; b) forwarding the switch address frame as a normal OPEN address frame to an expander outside of the path of the established connection between the initiator and the existing target end device upon a determination that the path between the initiator and the next target end device does not include a downstream expander in the path of the established connection between the initiator and the existing target end device; c) establishing a connection to the locally attached expander based upon the received switch address frame upon a determination that the path between the initiator and the next target end device does not include a downstream expander in the path of the established connection between the initiator and the existing target end device; and/or d) closing a connection to the downstream expander upon the determination that the path between the initiator and the next target end device does not include a downstream expander in the path of the established connection between the initiator and the existing target end device.

The method 800 can also include a step 860, wherein the step 860 includes reusing a partial path of the established connection or extending a path of the established connection for the connection between the initiator and the next target end device. The existing target end device and the next target end device are locally attached to different expanders.

Figure 9A:
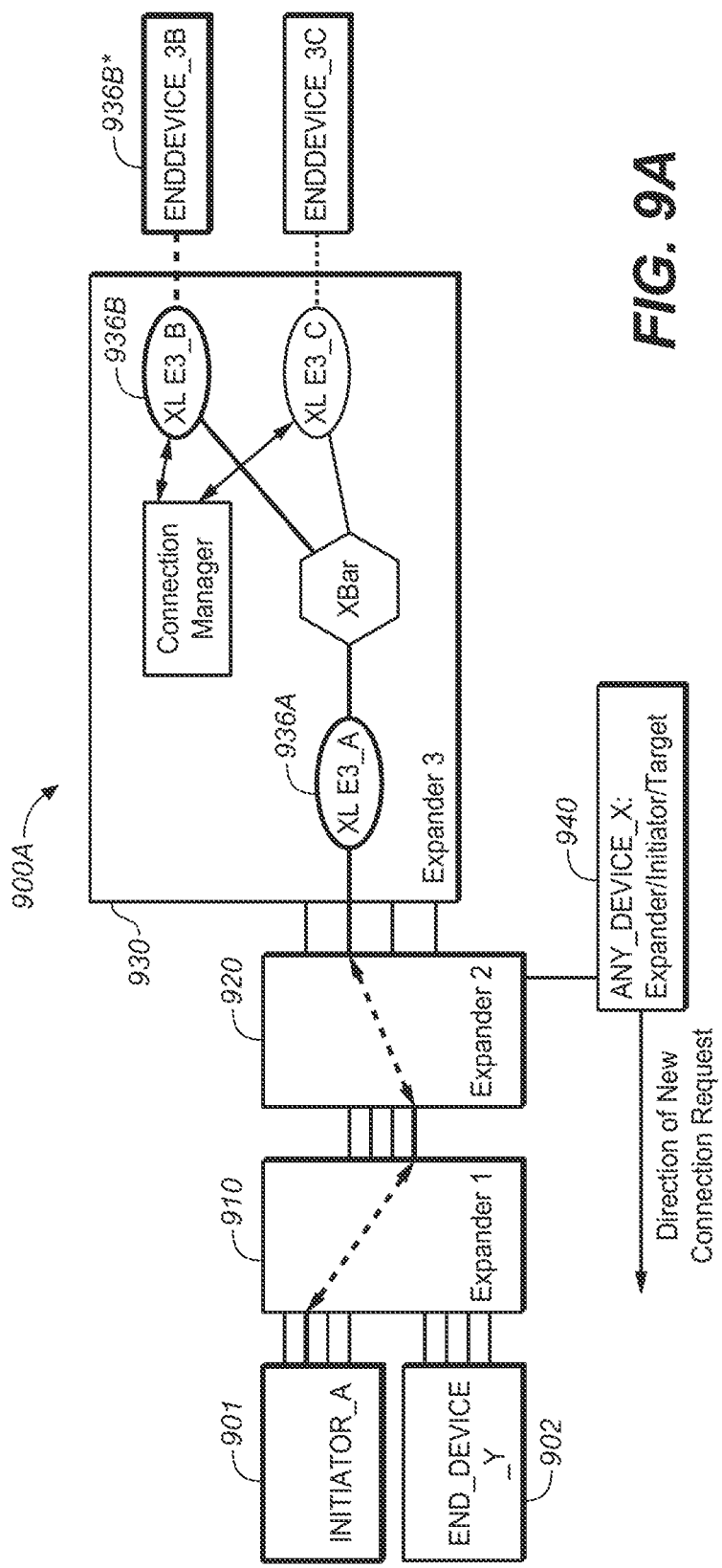
FIGS. 9A-B show a multi-expander system topology and an expander initiating FCS.
Figure 9B:
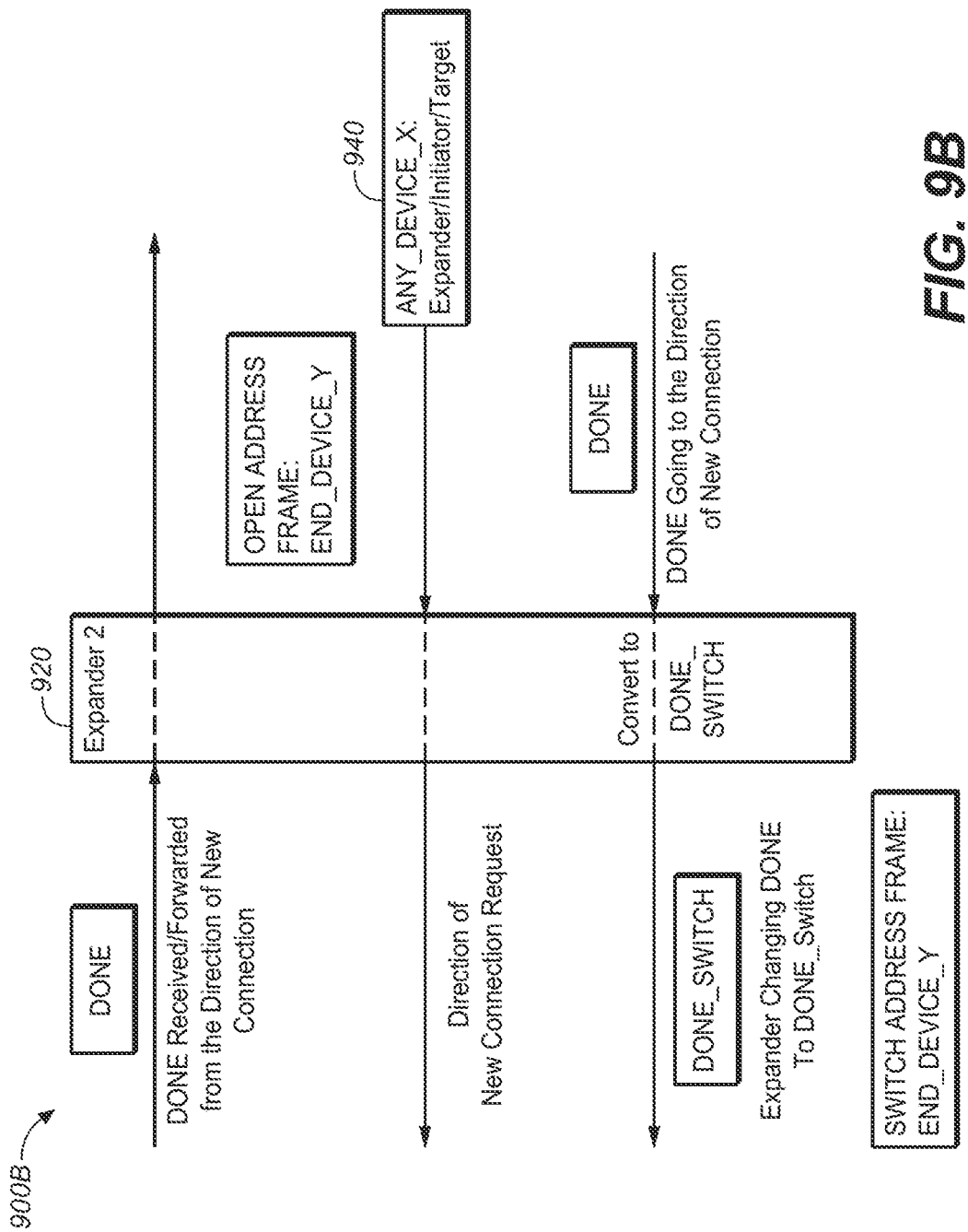

Referring to FIGS. 9A and 9B, a multi-expander system topology 900A and expander actions 900B are shown such that expander 920 is configured for initiating Fast Context Switching. The multi-expander system topology 900A can include a plurality of communicatively coupled devices. As shown in FIG. 9A, the multi-expander system topology 900A can include: initiator 901; end device 902; expanders 910, 920, 930; connected device 940 (e.g., an expander, an initiator, or a target end device); end device 936B*; or the like.

In some implementations, one or more of the expanders 910, 920, 930 of the multi-expander system topology 900A can be configured as expander 200 of FIG. 2; in some implementations, one or more of the expanders 910, 920, 930 can be configured in a different way than expander 200 of FIG. 2. For example, expander 930 can include a plurality of phys and/or expander link layers 936A-B, a crossbar switch, a connection manager, other computer components (such as computer components depicted in expander 200 of FIG. 2), and/or the like.

The initiator 901 can be directly attached and communicatively coupled to one or more expanders and/or one or more end devices. Each expander can be directly attached and communicatively coupled to an initiator, one or more expanders, and/or one or more end devices. For example, in FIG. 9A, end device 936B* is directly attached to expander 930, and the connected device 940 is directly attached to expander 920.

There is a plurality of possible connection paths for connecting particular devices of the multi-expander system topology 900A. For example, FIG. 9A depicts an established connection between the initiator 901 with an existing target end device 936B*, wherein the established connection is through a chain of expanders (i.e., expander 910 to expander 920 to expander 930).

As shown in FIGS. 9A and 9B, the expander 920 can initiate FCS. For example, the connected device 940 (i.e., "ANY_DEVICE_X") can request a connection to the end device 902 (i.e., "END_DEVICE_Y"). The connected device 940 can comprise an initiator, an expander, or an end device, and similarly, the end device 902 can comprise an initiator, an expander, or an end device.

The expander 920 initiates FCS if the connection manager of the expander 920 detects that a direct attached device (such as any expander, initiator, or end device) has requested a new connection with an end device (such as an expander, an initiator, or a target end device) and if the connection manager determines that the expander 920 has a connection partially or fully established along a path of the requested new connection.

The expander 920 then checks if the expander 920 has received a first DONE primitive from a direction of the new connection. In some implementations, checking if the expander 920 has received the first DONE primitive from the direction of the new connection may include the connection manager of the expander 920 being configured to wait for receipt of the first DONE primitive from the direction of the new connection.

The expander 920 can concurrently check for or wait for a second DONE primitive going in a direction of the new connection. In some implementations, the second DONE primitive going in the direction of the new connection and the first DONE primitive received from the direction of the new connection may be received by the expander 920 at the same time, at approximately the same time, or at different times.

Upon receiving the second DONE primitive, the expander 920 converts the second DONE primitive into a DONE_SWITCH.

The expander 920 then forwards the DONE_SWITCH in the direction of the new connection and sends a Switch Address Frame in the direction of the new connection to switch and establish the new connection. The switching and establishing of the new connection will be completed pursuant to the aforementioned partial path reuse and extension mechanism in the context of an initiator.

It is believed that the present invention and many of its attendant advantages will be understood by the foregoing description, and it will be apparent that various changes can be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for switching from an existing target end device to a next target end device in a multi-expander storage topology, the multi-expander topology including at least one initiator and at least two expanders, the at least two expanders including a first expander and a second expander, wherein the first expander is locally attached to the existing target end device and the second expander is locally attached to the next target end device, the method comprising:
   receiving, from an initiator of the at least one initiator or an upstream expander of the at least two expanders, a done switch issued by the initiator, wherein the done switch is configured to close an established connection between the initiator and the existing target end device;
   receiving, from the initiator or the upstream expander, a switch address frame, wherein the switch address frame is configured to instruct the second expander locally attached to the next target end device to establish a connection between the initiator and the next target end device; and
   performing at least one action, the at least one action including:
   reusing a partial path of the established connection between the initiator and the existing target end device for the connection between the initiator and the next target end device, wherein the existing target end device and the next target end device are locally attached to different expanders; or
   extending a path of the established connection between the initiator and the existing target end device for the connection between the initiator and the next target end device, wherein the existing target end device and the next target end device are locally attached to different expanders.

2. The method of claim 1, further comprising:
   using Fast Context Switching protocol.

3. The method of claim 2, wherein the done switch is a DONE_SWITCH primitive and the switch address frame is a SWITCH_ADDRESS_FRAME.

4. The method of claim 1, further comprising:
   monitoring for the switch address frame issued by the initiator upon receiving the done switch issued by the initiator.

5. The method of claim 1, further comprising:
   determining if the path between the initiator and the next target end device includes a downstream expander which is in the path of the established connection between the initiator and the existing target end device.

6. The method of claim 5, further comprising:
   forwarding the switch address frame to the downstream expander which is in the path of the established connection between the initiator and the existing target end device upon a determination that the path between the initiator and the next target end device includes the downstream expander which is in the path of the established connection between the initiator and the existing target end device.

7. The method of claim 5, further comprising:
   forwarding the switch address frame as an OPEN address frame to an expander outside of the path of the established connection between the initiator and the existing target end device upon a determination that the path between the initiator and the next target end device does not include a downstream expander in the path of the established connection between the initiator and the existing target end device.

8. The method of claim 5, further comprising:
   establishing a connection to the locally attached expander based upon the received switch address frame upon a determination that the path between the initiator and the next target end device does not include a downstream expander in the path of the established connection between the initiator and the existing target end device; and
   closing a connection to the downstream expander upon the determination that the path between the initiator and the next target end device does not include a downstream expander in the path of the established connection between the initiator and the existing target end device.

9. The method of claim 5, further comprising:
   closing a connection to the downstream expander upon a determination that the path between the initiator and the next target end device does not include a downstream expander in the path of the established connection between the initiator and the existing target end device.

10. The method of claim 1, further comprising:
    forwarding the done switch to the last expander on a path of the established connection between the initiator and the existing target end device.

11. An apparatus configured for use in a multi-expander storage topology, the multi-expander topology including at least one initiator and at least two expanders, the at least two expanders including a first expander and a second expander, wherein the first expander is locally attached to the existing target end device and the second expander is locally attached to the next target end device, the apparatus comprising:
    an expander, wherein the expander is configured for:
    receiving, from an initiator of the at least one initiator or an upstream expander of the at least two expanders, a done switch issued by the initiator, wherein the done switch is configured to close an established connection between the initiator and the existing target end device;

monitoring for a switch address frame issued by the initiator upon receiving the done switch issued by the initiator, wherein the switch address frame is configured to instruct the second expander locally attached to the next target end device to establish a connection between the initiator and the next target end device;

receiving, from the initiator or the upstream expander, the switch address frame; and performing at least one action, the at least one action including:

reusing a partial path of the established connection between the initiator and the existing target end device for the connection between the initiator and the next target end device, wherein the existing target end device and the next target end device are locally attached to different expanders; or extending a path of the established connection between the initiator and the existing target end device for the connection between the initiator and the next target end device, wherein the existing target end device and the next target end device are locally attached to different expanders.

12. The apparatus of claim 11, wherein the expander is further configured for using Fast Context Switching protocol.

13. The apparatus of claim 11, wherein the expander is further configured for:

determining if the path between the initiator and the next target end device includes a downstream expander which is in the path of the established connection between the initiator and the existing target end device.

14. The apparatus of claim 13, wherein the expander is further configured for:

forwarding the switch address frame to the downstream expander which is in the path of the established connection between the initiator and the existing target end device upon a determination that the path between the initiator and the next target end device includes the downstream expander which is in the path of the established connection between the initiator and the existing target end device.

15. The apparatus of claim 13, wherein the expander is further configured for:

forwarding the switch address frame as an OPEN address frame to an expander outside of the path of the established connection between the initiator and the existing target end device upon a determination that the path between the initiator and the next target end device does not include a downstream expander in the path of the established connection between the initiator and the existing target end device.

16. The apparatus of claim 13, wherein the expander is further configured for:

establishing a connection to the locally attached expander based upon the received switch address frame upon a determination that the path between the initiator and the next target end device does not include a downstream expander in the path of the established connection between the initiator and the existing target end device; and closing a connection to the downstream expander upon the determination that the path between the initiator and the next target end device does not include a downstream expander in the path of the established connection between the initiator and the existing target end device.

17. The apparatus of claim 13, wherein the expander is further configured for:

closing a connection to the downstream expander upon a determination that the path between the initiator and the next target end device does not include a downstream expander in the path of the established connection between the initiator and the existing target end device.

18. A multi-expander system, comprising:

at least one initiator, the at least one initiator including an initiator; a plurality of end devices, the plurality of end devices including an existing target end device and a next target end device; at least two expanders, the at least two expanders including a first expander and a second expander, wherein the first expander is locally attached to the existing target end device and the second expander is locally attached to the next target end device, wherein each expander of the at least two expanders is configured for:

receiving, from an initiator of the at least one initiator or an upstream expander of the at least two expanders, a done switch issued by the initiator, wherein the done switch is configured to close an established connection between the initiator and the existing target end device;

monitoring for a switch address frame issued by the initiator upon receiving the done switch issued by the initiator, wherein the switch address frame is configured to instruct the second expander locally attached to the next target end device to establish a connection between the initiator and the next target end device;

receiving, from the initiator or the upstream expander, the switch address frame; and performing at least one action, the at least one action including:

reusing a partial path of the established connection between the initiator and the existing target end device for the connection between the initiator and the next target end device, wherein the existing target end device and the next target end device are locally attached to different expanders; or extending a path of the established connection between the initiator and the existing target end device for the connection between the initiator and the next target end device, wherein the existing target end device and the next target end device are locally attached to different expanders.

19. The system of claim 18, wherein each expander of the at least two expanders is further configured for using Fast Context Switching protocol.

20. The system of claim 18, wherein each expander of the at least two expanders is further configured for:

determining if the path between the initiator and the next target end device includes a downstream expander which is in the path of the established connection between the initiator and the existing target end device; and forwarding the switch address frame to an expander outside of the path of the established connection between the initiator and the existing target end device upon a determination that the path between the initiator and the next target end device does not include a downstream expander in the path of the established connection between the initiator and the existing target end device.

* * * * *